United States Patent
Labastrou

[15] 3,664,011
[45] May 23, 1972

[54] METHOD OF MAKING A JOINERY JOINT

[72] Inventor: Roger Labastrou, Ile Bizard, Quebec, Canada

[73] Assignee: Jacques Guillon Designers Inc., Montreal, Canada

[22] Filed: Aug. 8, 1969

[21] Appl. No.: 849,305

[52] U.S. Cl. ..................29/526, 144/309 L, 144/309 M, 287/20.92 K, 287/20.92 G, 287/20.92 T
[51] Int. Cl. ..........................................B23p 19/00
[58] Field of Search ..........29/526, 521; 144/309.13, 309 L, 144/309 M; 287/20.92 K, 20.92 T, 20.92 G

[56] References Cited

UNITED STATES PATENTS

| 706,763 | 8/1902 | Lange | 287/20.92 TG X |
| 1,250,841 | 12/1917 | Gandell | 144/309.13 UX |
| 2,363,405 | 11/1944 | Eichelberger | 287/20.92 K X |
| 2,495,966 | 1/1950 | Haines | 287/20.92 TG |
| 3,090,086 | 5/1963 | Fata | 287/20.92 G |

FOREIGN PATENTS OR APPLICATIONS

| 944,184 | 12/1963 | Great Britain | 144/309.13 |
| 1,117,151 | 6/1968 | Great Britain | 144/309.13 |

*Primary Examiner*—Charlie T. Moon
*Attorney*—Raymond A. Robic

[57] ABSTRACT

This invention relates to a method and means for making a continuous joint between panel members, the new joint being a modified form of a dovetail joint an preserving the rigidity of assembly which is characteristic thereto, while being as easy to assemble and disassemble as a tongue and groove joint.

7 Claims, 7 Drawing Figures

Patented May 23, 1972
3,664,011
2 Sheets-Sheet 1
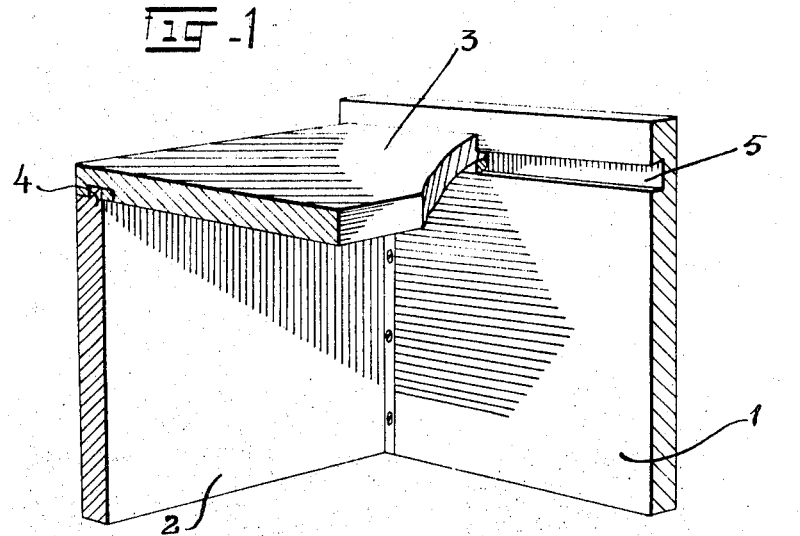
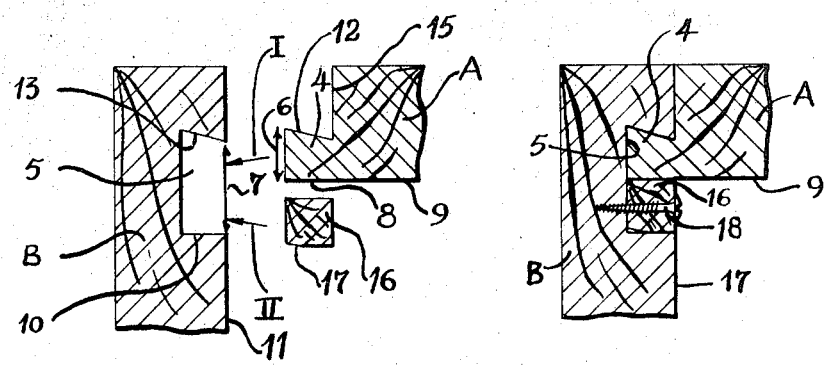
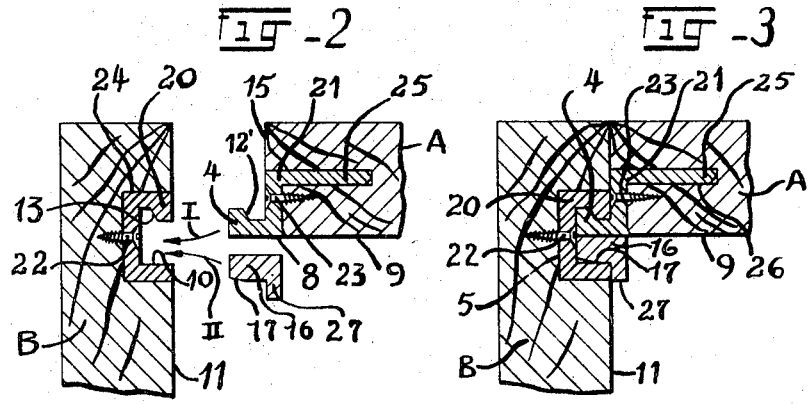
INVENTOR
Roger LABASTROU
ATTORNEY INVENTOR
Roger LABASTROU

ATTORNEY

METHOD OF MAKING A JOINERY JOINT

This invention relates to an improvement in the art of making a semi-permanent continuous joint between panels.

The new method and means of the invention for realizing a joint between panel members have been developed particularly for use in the construction of furniture, where it is found to present a number of advantages over and above those of the more conventional methods and means. It is to be understood that there is nothing in the invention proper suggesting that its field of useful utility would not include a number of other applications in which similar or even greater advantages might be derived therefrom.

The joint of the invention is purposely designed so that it can be realized or dismantled very rapidly, without special tools and without resulting injury to the material of the joined panels. It is also a distinct advantage that joints realized in accordance with the present invention can be assembled and dismantled any number of time without any resulting ill effects.

It is a significant characteristic of the invention that articles of furniture such as, desks, chests, dressers and the like, wherein it is used, can be assembled and dismantled very rapidly and without handtools of any kind. This characteristic is of particular advantage as it applies to the construction of modular furniture; for instance, where it is used in the construction of modular office furniture, such as office desks and the like, it is found that it is now possible for anyone to easily and rapidly erect such modular arrangement as well as rearrange or add to existing arrangements.

Although joints in accordance with the principle of the present invention can be realized by appropriately forming or machining the proper jointing elements in the material of the panels to be joined, it can also be realized with even greater expediency utilizing preformed metal or plastic members which in order to be installed on the respective panels require simpler machining thereof. Joints realized in this preferred manner would also have the added advantage of permitting a suitable choice of the material in order to produce a joint of any desired strength and degree of dimensional accuracy.

It is a further characteristic of the joint of the present invention that the means used therefor can be totally non visible from the exposed side of the assembly of panels realized thereby.

The foregoing characteristics of the invention and advantages thereof will be better understood from the following description of some preferred embodiments thereof, reference being made throughout the accompanying drawing wherein:

FIG. 1 is a perspective view of a corner of a box construction in which the joints between panels are made in accordance with the invention;

FIG. 2 is an exploded cross-sectional view of a joint of the invention;

FIG. 3 is a cross-sectional view corresponding to FIG. 2;

FIG. 4 is an exploded cross-sectional view of a joint in accordance with a preferred embodiment of the invention;

FIG. 5 is a cross-sectional view corresponding to FIG. 4;

Figure 6:
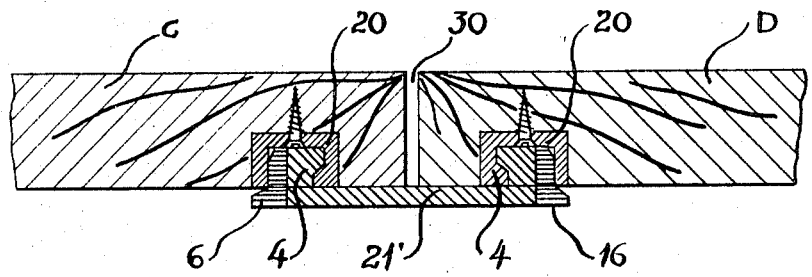
FIG. 6 is a cross-sectional view of a joint realized in accordance with the invention between two coplanar panels.

In FIG. 1 there is shown the corner of a box construction in which all the joints between the panels 1, 2 and 3 are realized in accordance with the present invention and particularly in accordance with the embodiment thereof that is illustrated in FIGS. 2 and 3.

In FIGS. 2 to 4, it is observed that there is one panel A which is in edge abutting relationship with respect to another panel B; the panels A presenting the male parts of the joints whereas the panels B present the female parts of the same joints. The male elements are in the form of semi-dovetail profiled tongues 4, the female elements are semi-dovetail profiled grooves 5. In each case, the maximum width 6 of the tongue 4 must be less than the least width 7 of the corresponding groove 5 in order to permit free entry of the former in the latter.

Each semi-dovetail profiled tongue presents one lateral surface 8 that is parallel to and coplanar with the inside surface 9 of the panel A and each semi-dovetail profiled groove presents a side surface 10 disposed normally to the inside surface 11 of the panel B.

In FIGS. 1 through 3, the other lateral surface 12 of the tongue 4 generally extends divergently with respect to the lateral surface 8; in the embodiment of FIGS. 4 and 5, the same general relationship is observed but it is realized through a series of consecutive surfaces disposed in a step like arrangement 12'.

The other side surface of the groove 13 or 13' must match the attitude and profile of the corresponding lateral surface 12 or arrangement 12' of lateral surface respectively.

The assembly of the joint is realized by initially inserting the tongue 4 in the groove 5 until the edge surface 15 of the panel A bears against the inside surface 11 of the panel B, as generally indicated by arrow I. Simultaneously, the surfaces 12 and 12' may be urged to lie in close proximity to the surfaces 13 and 13' respectively, thereby leaving a gap between the surfaces 8 and 10. Closure of the joint is effected by positioning a locking strip 16 in the said gap as generally indicated by arrow II. The profile of the locking strip 16 is essentially rectangular and coincides as closely as possible to the profile of the said gap. To permit easy entry of the locking strip 16 into the said gap, there is advantage in forming a slight bevel 17 at the leading edge of the said locking strip 16, but the bevel should never reach back anywhere as far as the entry area of the groove 5.

Although the locking strip 16 might conceivably be retained in position in the groove, particularly if it fits so tightly therein that it has to be forced in position, it is nevertheless found preferable in most cases to provide concrete means to secure it in that position, such as, for instance, screw 18 in FIG. 3.

In FIGS. 4 and 5, it is seen that a similar joint may be realized by means of separate interlocking elements 20 and 21 which are secured in their respective positions on the panel members such as by means of screws 22 and 23 respectively.

The element 20 has an external rectangular profile and is inserted in a corresponding rectangular groove 24, which is more easily produced than a groove having a semi-dovetail profile. Members such as the channel like groove insert 20, the tongue insert 21 and locking strip 16 of FIGS. 4 and 5 can advantageously be made of metal and produced to the desired degree of tight fitting accuracy by extrusion. The tongue insert 21 may be provided with a blade like limb 25 which fits tightly in a saw-cut 26 purposely practiced along the edge surface 15 of the panel A, parallel to and intermediate the opposite surfaces thereof. The locking strip 16 in FIGS. 4 and 5 presents a head portion 27 for use when it is positioned by hammering as well as to facilitate its removal such by prying with a blade like implement.

In FIG. 6, it is seen that coplanar panels C and D can be joined in accordance with the present invention by providing a channel like groove insert 20 on each panel, a yoke like double tongue insert 21', and two locking strips 16. It is observed that a short gap 30 remains between the panels; this gap 30 is geometrically necessary and must not be narrower than the difference in width between the narrowest and widest part of each tongue 4 of the double tongue yoke like insert 21'.

Figure 7:
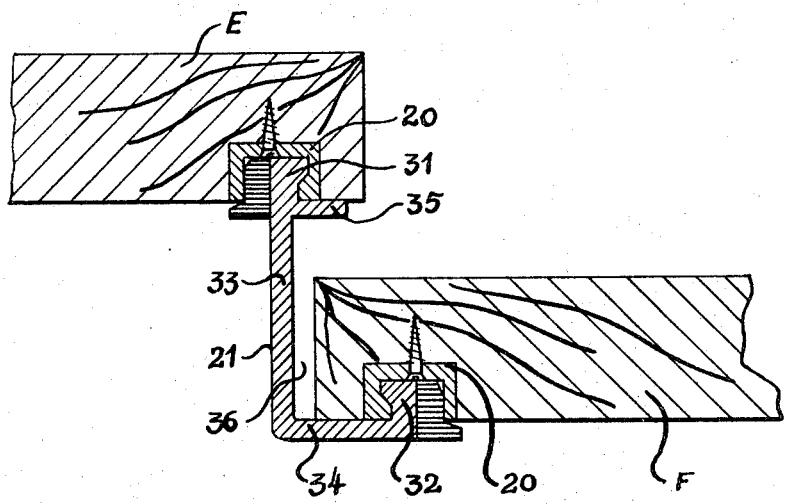
FIG. 7 is a cross-sectional view of another joint realized in accordance with the invention and particularly between two slightly spaced apart parallel panels.

In FIG. 7, it is observed that two panels E and F disposed in parallel and slightly spaced apart planes are joined in accordance with the present invention; the jointed panels presenting a slight edge overlap. Each panel E and F presents a channel like groove insert 20 and there is provided an angular double tongue insert 21" in which similarly oriented tongue insert portions 31 and 32 are disposed at the respective ends of right angularly connected limbs 33 and 34; a shoulder portion 35 being provided at the base of the tongue insert portion 31 in order to give greater stability to the joint. Locking strips 16 are provided. A gap 36 between limb 33 and the edge of panel F is geometrically necessary and dimensionally the same as gap 30 in FIG. 6.

I claim:

1. A method of making a joinery joint between two panel members disposed at right angle to one another with an edge surface of one member abutting against a panel surface of the other panel member, the said method comprising the steps of providing a tenon element along the abutting edge of said one panel member, the said tenon element having two lateral sides including a receding lateral side, the other lateral side being substantially co-planar with respect to one of the surfaces of said one panel member, providing a mortise element in the surface of said other panel member, the said mortise element having two lateral sides including a receding lateral side, the other lateral side being substantially perpendicular with respect to the said other panel member, said mortise element being at least as wide at the narrowest portion thereof as the said tenon element is at its widest portion, and introducing the said tenon element into the mortise element through the front opening thereof and laterally shifting same so that the receding side of the tenon element contacts the receding side of the mortise element, squarely inserting a tightly fitting joint closing and locking member into the remaining portion of the cross-sectional area of the mortise element for filling the same, said joint closing and locking member having essentially rectangular cross-section, each of said tenon and mortise elements and joint closing and locking members having respectively uniform cross-section throughout.

2. A method of making a joinery joint as claimed in claim 1, wherein the tenon element is integrally formed with the said one panel.

3. A method of making a joinery joint according to claim 1, which includes fastening said joint closing and locking member to said other panel in position in said mortise element.

4. A method of making a joinery joint as claimed in claim 1, wherein said tenon element is a separate member relative to said one panel member, the said method comprising rigidly securing said separate member to said one panel member.

5. A method of making a joinery joint as claimed in claim 1, wherein said mortise element in said other panel member is a separate member relative to said other panel, the said method comprising forming a rectangular groove at the surface of said other panel member and inserting said mortise element into said groove.

6. A method of making a joinery joint as claimed in claim 1, wherein said receding sides are flat to form a semi-dovetailed housing.

7. A method of making a joinery joint as claimed in claim 1, wherein said receding sides are oppositely formed hook shapes so as to engage each other.

* * * * *